United States Patent
Wang (10) Patent No.: US 11,194,378 B2
(45) Date of Patent: Dec. 7, 2021

(54) INFORMATION PROCESSING METHOD AND ELECTRONIC DEVICE

(71) Applicant: Lenovo (Beijing) Co., Ltd., Beijing (CN)

(72) Inventor: Xuyang Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 132 days.

(21) Appl. No.: 16/367,235

(22) Filed: Mar. 27, 2019

(65) Prior Publication Data

US 2019/0302869 A1    Oct. 3, 2019

(30) Foreign Application Priority Data

Mar. 28, 2018   (CN) .......................... 201810262323.6

(51) Int. Cl.
*G06F 1/3231* (2019.01)
*G06F 1/3287* (2019.01)
*G06F 3/16* (2006.01)
*G06F 40/30* (2020.01)
*G06F 40/289* (2020.01)

(52) U.S. Cl.
CPC .......... *G06F 1/3231* (2013.01); *G06F 1/3287* (2013.01); *G06F 3/167* (2013.01); *G06F 40/289* (2020.01); *G06F 40/30* (2020.01)

(58) Field of Classification Search
CPC .... G06F 1/3231; G06F 1/3287; G06F 40/289; G06F 40/30; G06F 3/167
See application file for complete search history.

(56) References Cited

U.S. PATENT DOCUMENTS

| | | | |
|---|---|---|---|
| 9,275,637 B1* | 3/2016 | Salvador | G10L 15/06 |
| 10,629,204 B2* | 4/2020 | Mitic | G10L 15/08 |
| 2014/0365225 A1* | 12/2014 | Haiut | G10L 15/22 704/275 |
| 2015/0245154 A1* | 8/2015 | Dadu | G10L 15/22 381/56 |
| 2016/0063995 A1* | 3/2016 | Choi | G06F 3/0482 704/245 |
| 2016/0086603 A1 | 3/2016 | Rosner et al. | |
| 2017/0193998 A1* | 7/2017 | Sharifi | G10L 15/08 |
| 2018/0012593 A1* | 1/2018 | Prasad | G10L 15/08 |
| 2018/0102125 A1* | 4/2018 | Ko | G10L 15/08 |
| 2019/0122656 A1* | 4/2019 | Clark | G10L 15/063 |

FOREIGN PATENT DOCUMENTS

| | | |
|---|---|---|
| CN | 1416560 A | 5/2003 |
| CN | 104424290 A | 3/2015 |
| CN | 106297777 A | 1/2017 |
| CN | 107147618 A | 9/2017 |

* cited by examiner

*Primary Examiner* — Jaweed A Abbaszadeh
*Assistant Examiner* — Hyun Soo Kim
(74) *Attorney, Agent, or Firm* — Anova Law Group, PLLC (57) ABSTRACT

An information processing method and an electronic device are provided. The method is applied to an electronic device and comprises collecting audio information received by the electronic device before waking up the electronic device; storing the audio information; and based on the stored audio information, generating alternative wake words. The wake words facilitate the electronic device to switch from a sleep mode to a wake mode.

7 Claims, 4 Drawing Sheets

INFORMATION PROCESSING METHOD AND ELECTRONIC DEVICE

CROSS-REFERENCES TO RELATED APPLICATIONS

This application claims the priority of Chinese Patent Application No. 201810262323.6, filed on Mar. 28, 2018, the entire contents of which are incorporated herein by reference.

FIELD OF THE DISCLOSURE

The present disclosure generally relates to the field of electronic technology and, more particularly, relates to an information processing method and an electronic device.

BACKGROUND

With the continuous development of electronic technology, electronic devices have more and more functions. Among them, most electronic devices have voice interaction capabilities.

The present voice interaction function of an electronic device often uses audio wake words or phrases to wake up the electronic device from a low-power mode or sleep mode to accomplish complex voice interaction tasks with a user. The wake words may be pre-configured in the electronic device by the factory or configured by the user. In either case of the wake words being pre-configured by the factory or the user, the user may be required to memorize the wake words and to accurately speak the wake words. Otherwise the electronic device may not be woken up to perform the voice interaction function.

However, the user may not accurately memorize the wake words. Repeated attempts to speak a few words that are similar to the configured wake words in pronunciation or semantic meaning may not wake up the device, thereby degrading the user experience.

The disclosed information processing method and electronic device are directed to solve one or more problems set forth above and other problems in the art.

BRIEF SUMMARY OF THE DISCLOSURE

One aspect of the present disclosure provides an information processing method. The method is applied to an electronic device and comprises collecting audio information inputted into the electronic device before waking up the electronic device; storing the audio information; and based on the stored audio information, generating alternative wake words. The wake words facilitate the electronic device to switch from a sleep mode to a wake mode.

Another aspect of the present disclosure provides an electronic device. The electronic device includes a memory configured to store application programs and data generated by executing the application programs, and to store audio information; an audio collector configured to collect the audio information inputted into an electronic device by a user before waking up the electronic device; and a processor configured to generate alternative wake words based on the stored audio information.

Another aspect of the present disclosure provides an information processing system. The system includes a server including a memory configured to store application programs and data generated by executing the application programs, and to store audio information and a processor configured to generate alternative wake words based on the stored audio information; and an electronic device including an audio collector configured to collect the audio information inputted into an electronic device by a user before waking up the electronic device. The server and the electronic device communication with each other.

An information processing system. The system includes a server including a memory configured to store application programs and data generated by executing the application programs, and to store audio information and a processor configured to generate alternative wake words based on the stored audio information. The system further includes and an electronic device including an audio collector configured to collect the audio information received by an electronic device by a user before waking up the electronic device, wherein the server and the electronic device communication with each other.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts and may be encompassed in the present disclosure.

DETAILED DESCRIPTION

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

The present disclosure provides an information processing method, which can automatically expand the wake words. Through the expanded wake words, a user may wake up an electronic device more rapidly, thereby improving the user experience.

Figure 1:
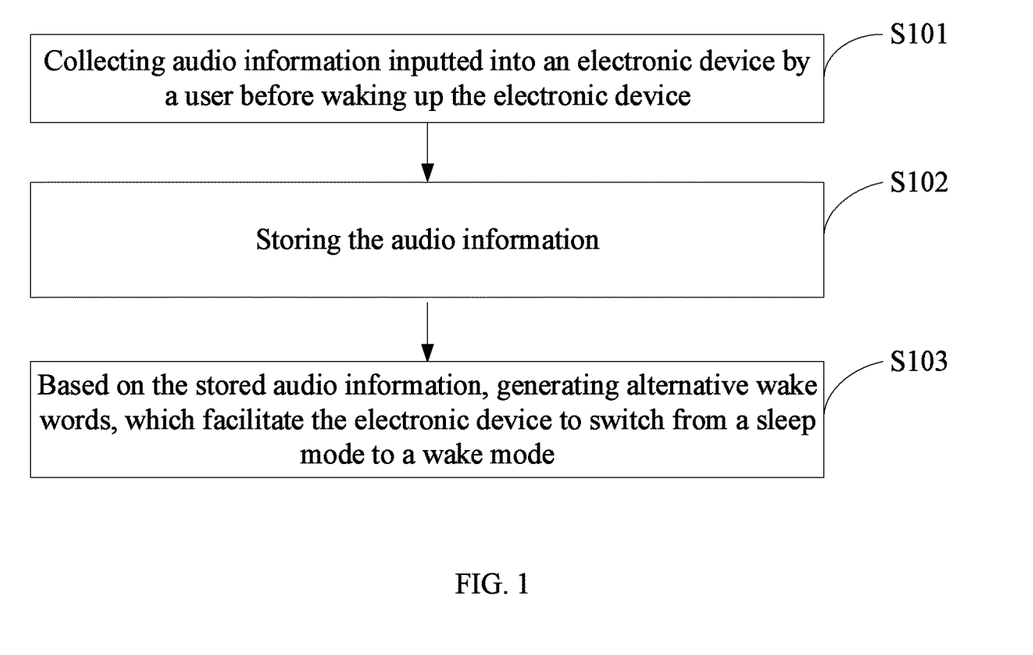
FIG. 1 illustrates a flow chart of an example of an information processing method according to some embodiments of the present disclosure.

FIG. 1 illustrates a flow chart of an example of an information processing method according to some embodiments of the present disclosure. The method may be applied to electronic devices. In one embodiment, as shown in FIG. 1, the method may include the following steps.

Step S101: collecting audio information inputted into an electronic device by a user before waking up the electronic device.

When it is required to automatically expand the wake words of the electronic device, the audio information inputted into the electronic device by the user may be collected before waking up the electronic device. For example, before waking up the electronic device, a user A may input the audio information "how is the weather today" into the electronic device. The audio information "how is the weather today" inputted by the user A may be collected. When the audio information inputted into the electronic device by the user is collected, a microphone of the electronic device may be utilized for the collection. In addition, when the audio information inputted into the electronic device by the user is collected before waking up the electronic device, a certain collection frequency may be configured. For example, the collection frequency may be configured to be once every 10 minutes.

Step S102: storing the audio information.

Because the processing power of the electronic device before being woken up is low, the audio information inputted into the electronic device by the user collected before waking up the electronic device may be stored.

Step S103: based on the stored audio information, generating alternative wake words. The alternative wake words may facilitate the electronic device to switch from a sleep mode to a wake mode.

When the processing power of the electronic device is no longer low, that is, after the electronic device is woken up, the stored audio information may be processed to generate the wake words capable of switching the electronic device from the sleep mode to the wake mode. For example, "the weather today" may be the alternative wake words of the electronic device.

In some embodiments, when it is required to automatically expand the wake words of the electronic device, the audio information inputted into the electronic device by the user may be collected. After being collected, the audio information may be stored. In the present disclosure, the wake words may be automatically expanded. Through the expanded wake words, the user may wake up the electronic device more rapidly, thereby improving the user experience.

Figure 2:
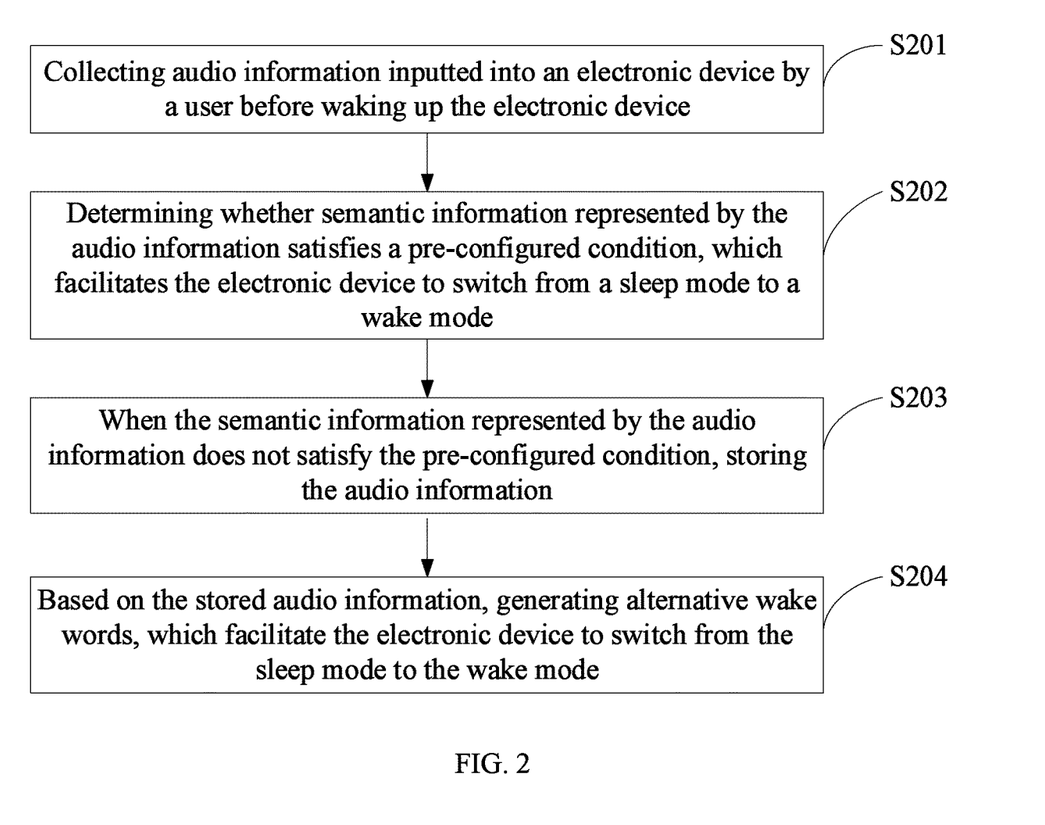
FIG. 2 illustrates a flow chart of another example of an information processing method according to some embodiments of the present disclosure.

FIG. 2 illustrates a flow chart of another example of an information processing method according to some embodiments of the present disclosure. The method may be applied to electronic devices. In one embodiment, as shown in FIG. 2, the method may include the following steps.

Step S201: collecting audio information inputted into an electronic device by a user before waking up the electronic device.

When it is required to automatically expand the wake words of the electronic device, the audio information inputted into the electronic device by the user may be collected before waking up the electronic device. For example, before waking up the electronic device, a user A may input the audio information "how is the weather today" into the electronic device. The audio information "how is the weather today" inputted by the user A may be collected. When the audio information inputted into the electronic device by the user is collected, a microphone of the electronic device may be utilized for the collection. In addition, when the audio information inputted into the electronic device by the user is collected before waking up the electronic device, a certain collection frequency may be configured. For example, the collection frequency may be configured to be once every 10 minutes.

Step S202: determining whether semantic information represented by the audio information satisfies a pre-configured condition. The pre-configured condition may facilitate the electronic device to switch from a sleep mode to a wake mode.

After the audio information inputted into the electronic device by the user is collected before waking up the electronic device, whether the semantic information represented by the audio information facilitates the electronic device to switch from the sleep mode to the wake mode may be further determined. It should be noted that, when determining whether the semantic information represented by the collected audio information facilitates the electronic device to switch from the sleep mode to the wake mode, the collected audio information may be semantically understood to obtain the semantic information corresponding to the audio information.

Step S203: when the semantic information represented by the audio information does not satisfy the pre-configured condition, storing the audio information.

When the semantic information represented by the audio information is unable to switch the electronic device from the sleep mode to the wake mode, because the processing power of the electronic device before being woken up is low, the audio information inputted into the electronic device by the user collected before waking up the electronic device may be stored. For example, "how is the weather today" outputted by the user may be stored.

Step S204: based on the stored audio information, generating alternative wake words. The alternative wake words may facilitate the electronic device to switch from the sleep mode to the wake mode.

When the processing power of the electronic device is no longer low, that is, after the electronic device is woken up, the stored audio information may be processed to generate the wake words capable of switching the electronic device from the sleep mode to the wake mode. For example, "the weather today" from "how is the weather today" may be the alternative wake words of the electronic device.

In some embodiments, when it is required to automatically expand the wake words of the electronic device, the audio information inputted into the electronic device by the user may be collected, and whether the semantic information represented by the collected audio information is able to switch the electronic device from the sleep mode to the wake mode may be determined. When the semantic information represented by the audio information is unable to switch the electronic device from the sleep mode to the wake mode, the collected audio information may be stored. Then, based on the stored audio information, the wake words capable of switching the electronic device from the sleep mode to the wake mode may be generated. In the present disclosure, the wake words may be automatically expanded. Through the expanded wake words, the user may wake up the electronic device more rapidly, thereby improving the user experience.

Specifically, in some embodiments, in step S103 and step S204, generating the alternative wake words based on the stored audio information may include in an idle time in the wake mode of the electronic device, generating the alternative wake words based on the stored audio information. By processing the stored audio information in the idle time in the wake mode of the electronic device, the processing power of the electronic device to process the audio information may be substantially enhanced.

Specifically, in some embodiments, generating the alternative wake words based on the stored audio information may include the following steps.

Step S1: dividing the audio information into at least one unit of to-be-processed information.

When generating the alternative wake words based on the stored audio information, the obtained audio information may be divided into at least one unit of the to-be-processed information. For example, the audio information "how is the weather today" may be divided into two units of the to-be-processed information "the weather today" and "how is".

Step S2: calculating a similarity between each unit of the to-be-processed information and target wake words.

The similarity between each unit of the to-be-processed information and the target wake words may be calculated. The target wake words may be the words capable of waking up the electronic device. For example, assuming that "weather" is a target wake-up word. The similarities between the to-be-processed information "the weather today" and "weather" and the target wake-up word "weather" may be calculated.

Step S3: determining whether the similarity between each unit of the to-be-processed information and the target wake words is greater than a pre-configured threshold.

Based on the calculation result, whether the similarity between each unit of the to-be-processed information and the target wake words is greater than the pre-configured threshold may be determined. For example, whether the similarity is greater than 60% may be determined.

Step S4: when the similarity between the unit of the to-be-processed information and the target wake words is greater than the pre-configured threshold, the unit of the to-be-processed information may be determined to be the alternative wake words.

Through the determination, when the similarity between the unit of the to-be-processed information and the target wake words is greater than the pre-configured threshold, the unit of to-be-processed information may be determination to be the alternative wake words. For example, when the similarity between the unit of the to-be-processed information "the weather today" and the target wake words "weather" is greater than the pre-configured threshold, "the weather today" may be determined to be the alternative wake words.

Specifically, in some embodiments, to make the determined alternative wake words more prone to wake up the electronic device by the user, after it is determined that the similarity between the unit of the to-be-processed information and the target wake words is greater than the pre-configured threshold, another determination may be performed.

Step S5: determining whether the number of words of the unit of the to-be-processed information is within a pre-configured word number range.

That is, whether the number of words of the unit of the to-be-processed information having the similarity with the target wake words greater than the pre-configured threshold is within the pre-configured word number range may be further determined. For example, the pre-configured word number range may be between three and five words.

Step S6: when the number of words of the unit of the to-be-processed information is within the pre-configured word number range, the unit of the to-be-processed information is determined to be the alternative wake words.

When the similarity between the unit of the to-be-processed information and the target wake words is greater than the pre-configured threshold and the number of words is within the pre-configured word number range, the unit of the to-be-processed information may be determined to be the alternative wake words. For example, "the weather today" may be determined to be the alternative wake words.

Figure 3:
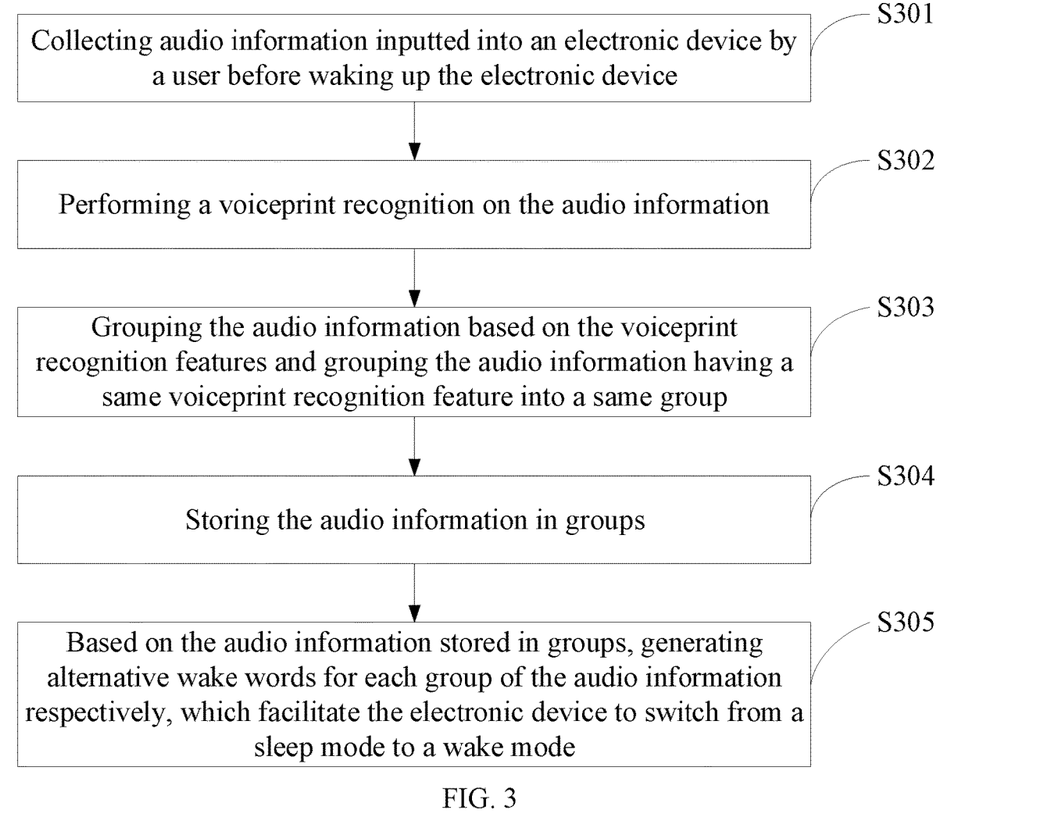
FIG. 3 illustrates a flow chart of another example of an information processing method according to some embodiments of the present disclosure.

FIG. 3 illustrates a flow chart of another example of an information processing method according to some embodiments of the present disclosure. The method may be applied to electronic devices. In one embodiment, as shown in FIG. 3, the method may include the following steps.

Step S301: collecting audio information inputted into an electronic device by a user before waking up the electronic device.

When it is required to automatically expand the wake words of the electronic device, the audio information inputted into the electronic device by the user may be collected before waking up the electronic device. For example, before waking up the electronic device, the user A may input the audio information "how is the weather today" into the electronic device. The audio information "how is the weather today" inputted by the user A may be collected. When the audio information inputted into the electronic device by the user is collected, the microphone of the electronic device may be utilized for the collection. In addition, when the audio information inputted into the electronic device by the user is collected before waking up the electronic device, a certain collection frequency may be configured. For example, the collection frequency may be configured to be once every 10 minutes.

Step S302: performing a voiceprint recognition on the audio information.

Before the electronic device is woken up, more than one user may input audio information into the electronic device. For example, the user A may input the audio information such as "how is the weather today" and "how is the weather in Beijing". The user B may input the audio information such as "how do I get to Beijing" and "how far is Beijing". To improve the user experience, different wake words may be expanded for different users. After the audio information inputted into the electronic device by the user is collected before waking up the electronic device, the voiceprint recognition may be performed on the audio information. Through the voiceprint recognition, different users may be recognized from the audio information.

Step S303: grouping the audio information based on the voiceprint recognition features and grouping the audio information having a same voiceprint recognition feature into a same group.

Through the voiceprint recognition, the audio information having the same voiceprint recognition feature may be grouped or classified together. That is, the audio information of a same user may be grouped together. For example, the user A inputted audio information "how is the weather today" and "how is the weather in Beijing" may be grouped together into one group and the user B inputted audio information "how do I get to Beijing" and "how far is Beijing" may be grouped together into another group.

Step S304: storing the audio information in groups.

Because the processing power of the electronic device before being woken up is low, the audio information inputted into the electronic device by the user collected before waking up the electronic device may be stored in groups.

Step S305: based on the audio information stored in groups, generating alternative wake words for each group of the audio information respectively. The alternative wake words may facilitate the electronic device to switch from a sleep mode to a wake mode.

When the processing power of the electronic device is no longer low, that is, after the electronic device is woken up, the audio information stored in groups may be processed respectively to generate the wake words capable of switching the electronic device from the sleep mode to the wake mode. For example, "the weather today" may be the alternative wake words of the electronic device.

In some embodiments, when it is required to automatically expand the wake words of the electronic device, the audio information inputted into the electronic device by the user may be collected, and the voiceprint recognition may be performed on the audio information. Based on the voiceprint recognition features, the audio information may be grouped or classified. The audio information having the same voiceprint recognition feature may be grouped together. The audio information may be stored in groups. The wake words capable of switching the electronic device from the sleep mode to the wake mode may be generated for each group of the audio information. In the present disclosure, the wake words may be automatically expanded. Through the expanded wake words, the user may wake up the electronic device more rapidly, thereby improving the user experience.

Figure 4:
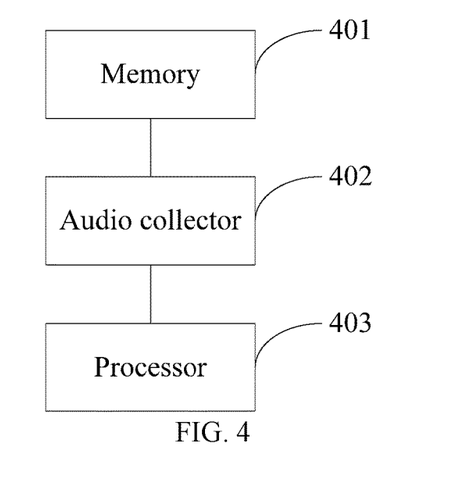
FIG. 4 illustrates a schematic view of an example of an electronic device according to some embodiments of the present disclosure.

FIG. 4 illustrates a schematic view of an example of an electronic device according to some embodiments of the present disclosure. In one embodiment, as shown in FIG. 4, the electronic device may include a memory 401, an audio collector 402, and a processor 403.

The memory 401 may be configured to store application programs and data generated by executing the application programs. The audio collector 402 may be configured to collect the audio information inputted into the electronic device by the user before waking up the electronic device.

When the wake words of the electronic device are automatically expanded, the audio information inputted into the electronic device by the user may be collected before waking up the electronic device. For example, before waking up the electronic device, the user A may input the audio information "how is the weather today" into the electronic device. The audio information "how is the weather today" outputted by the user may be collected. When collecting the audio information inputted into the electronic device by the user, the audio information may be collected through the microphone of the electronic device. In addition, when the audio information inputted into the electronic device by the user is collected before waking up the electronic device, a certain collection frequency may be configured. For example, the collection frequency may be configured to be once every 10 minutes.

The memory 401 may also be configured to store the audio information. Because the processing power of the electronic device before being woken up is low, the audio information inputted into the electronic device by the user collected before waking up the electronic device may be stored.

The processor 403 may be configured to execute the application programs to generate the alternative wake words based on the stored audio information. The alternative wake words may facilitate the electronic device to switch from a sleep mode to a wake mode.

When the processing power of the electronic device is no longer low, that is, after the electronic device is woken up, the stored audio information may be processed to generate the wake words capable of switching the electronic device from the sleep mode to the wake mode. For example, "the weather today" may be the alternative wake words of the electronic device.

In some embodiments, when it is required to automatically expand the wake words of the electronic device, the audio information inputted into the electronic device by the user may be collected. After being collected, the audio information may be stored. Based on the stored audio information, the wake words capable of switching the electronic device from the sleep mode to the wake mode may be generated. In the present disclosure, the wake words may be automatically expanded. Through the expanded wake words, the user may wake up the electronic device more rapidly, thereby improving the user experience.

Figure 5:
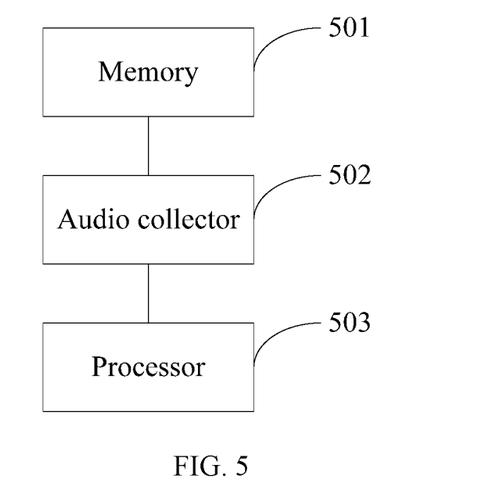
FIG. 5 illustrates a schematic view of another example of an electronic device according to some embodiments of the present disclosure.

FIG. 5 illustrates a schematic view of another example of an electronic device according to some embodiments of the present disclosure. In one embodiment, as shown in FIG. 5, the electronic device may include a memory 501, an audio collector 502, and a processor 503.

The memory 501 may be configured to store the application programs and the data generated by executing the application programs. The audio collector 502 may be configured to collect the audio information inputted into the electronic device by the user before waking up the electronic device.

When it is required to automatically expand the wake words of the electronic device, the audio information inputted into the electronic device by the user may be collected before waking up the electronic device. For example, before waking up the electronic device, the user A may input the audio information "how is the weather today" into the electronic device. The audio information "how is the weather today" outputted by the user may be collected. When collecting the audio information inputted into the electronic device by the user, the audio information may be collected through the microphone of the electronic device. In addition, when the audio information inputted into the electronic device by the user is collected before waking up the electronic device, a certain collection frequency may be configured. For example, the collection frequency may be configured to be once every 10 minutes.

The processor 503 may be configured to execute the application programs to determine whether the semantic information represented by the audio information satisfies a pre-configured condition. The pre-configured condition may facilitate the electronic device to switch from the sleep mode to the wake mode.

After the audio information inputted into the electronic device by the user is collected before waking up the electronic device, whether the semantic information represented by the audio information facilitates the electronic device to switch from the sleep mode to the wake mode may be further determined. It should be noted that, when determining whether the semantic information represented by the collected audio information facilitates the electronic device to switch from the sleep mode to the wake mode, the collected audio information may be semantically understood to obtain the semantic information corresponding to the audio information.

The memory 501 may be configured to store the audio information when the semantic information represented by the audio information does not satisfy the pre-configured condition.

When the semantic information represented by the audio information is unable to switch the electronic device from the sleep mode to the wake mode, because the processing power of the electronic device before being woken up is low, the audio information inputted into the electronic device by the user collected before waking up the electronic device may be stored. For example, "how is the weather today" outputted by the user may be stored.

The processor 503 may also be configured to generate the alternative wake words based on the stored audio information. The alternative wake words may facilitate the electronic device to switch from the sleep mode to the wake mode.

When the processing power of the electronic device is no longer low, that is, after the electronic device is woken up, the stored audio information may be processed to generate the wake words capable of switching the electronic device from the sleep mode to the wake mode. For example, "the weather today" from "how is the weather today" may be the alternative wake words of the electronic device.

In some embodiments, when it is required to automatically expand the wake words of the electronic device, the audio information inputted into the electronic device by the user may be collected, and whether the semantic information represented by the collected audio information is able to switch the electronic device from the sleep mode to the wake mode may be determined. When the semantic information represented by the audio information is unable to switch the electronic device from the sleep mode to the wake mode, the collected audio information may be stored. Then, based on the stored audio information, the wake words capable of switching the electronic device from the sleep mode to the wake mode may be generated. In the present disclosure, the wake words may be automatically expanded. Through the expanded wake words, the user may wake up the electronic device more rapidly, thereby improving the user experience.

Specifically, in some embodiments, generating the alternative wake words based on the stored audio information by the processor 503 may include: in an idle time in the wake mode of the electronic device, generating the alternative wake words based on the stored audio information. By processing the stored audio information in the idle time in the wake mode of the electronic device, the processing power of the electronic device to process the audio information may be substantially enhanced.

Specifically, in some embodiments, generating the alternative wake words based on the stored audio information by the processor 503 may include the following steps.

Step S1: dividing the audio information into at least one unit of to-be-processed information.

When generating the alternative wake words based on the stored audio information, the obtained audio information may be divided into at least one unit of the to-be-processed information. For example, the audio information "how is the weather today" may be divided into two units of the to-be-processed information "the weather today" and "how is".

Step S2: calculating a similarity between each unit of the to-be-processed information and target wake words.

The similarity between each unit of the to-be-processed information and the target wake words may be calculated. The target wake words may be the words capable of waking up the electronic device. For example, assuming that "weather" is a target wake-up word. The similarities between the to-be-processed information "the weather today" and "weather" and the target wake-up word "weather" may be calculated.

Step S3: determining whether the similarity between the unit of the to-be-processed information and the target wake words is greater than a pre-configured threshold.

Based on the calculation result, whether the similarity between the unit of the to-be-processed information and the target wake words is greater than the pre-configured threshold may be determined. For example, whether the similarity is greater than 60% may be determined.

Step S4: when the similarity between the unit of the to-be-processed information and the target wake words is greater than the pre-configured threshold, the unit of the to-be-processed information may be determined to be the alternative wake words.

Through the determination, when the similarity between the unit of the to-be-processed information and the target wake words is greater than the pre-configured threshold, the unit of the to-be-processed information may be determination to be the alternative wake words. For example, when the similarity between the unit of the to-be-processed information "the weather today" and the target wake words "weather" is greater than the pre-configured threshold, "the weather today" may be determined to be the alternative wake words.

Specifically, in some embodiments, to make the determined alternative wake words more prone to wake up the electronic device by the user, after it is determined that the similarity between the to-be-processed information and the target wake words is greater than the pre-configured threshold, another determination may be performed.

Step S5: determining whether the number of words of the unit of the to-be-processed information is within a pre-configured word number range.

That is, whether the number of words of the unit of the to-be-processed information having the similarity with the target wake words greater than the pre-configured threshold is within the pre-configured word number range may be further determined. For example, the pre-configured word number range may be between three and five words.

Step S6: when the number of words of the unit of the to-be-processed information is within the pre-configured word number range, the unit of the to-be-processed information is determined to be the alternative wake words.

When the similarity between the unit of the to-be-processed information and the target wake words is greater than the pre-configured threshold and the number of words is within the pre-configured word number range, the unit of the to-be-processed information may be determined to be the alternative wake words. For example, "the weather today" may be determined to be the alternative wake words.

Figure 6:
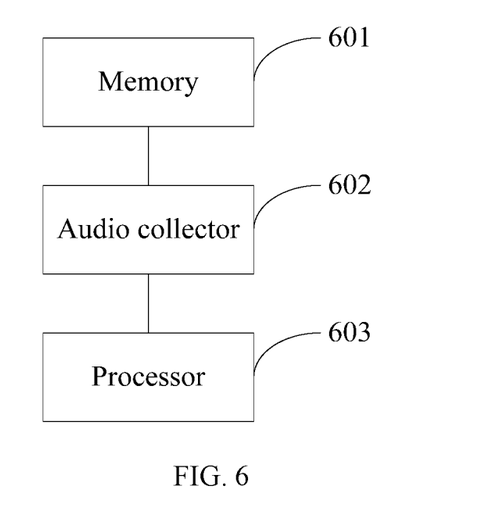
FIG. 6 illustrates a schematic view of another example of an electronic device according to some embodiments of the present disclosure.

FIG. 6 illustrates a schematic view of another example of an electronic device according to some embodiments of the present disclosure. In one embodiment, as shown in FIG. 6, the electronic device may include a memory 601, an audio collector 602, and a processor 603.

The memory 601 may be configured to store the application programs and the data generated by executing the application programs. The audio collector 602 may be configured to collect the audio information inputted into the electronic device by the user before waking up the electronic device.

When it is required to automatically expand the wake words of the electronic device, the audio information inputted into the electronic device by the user may be collected before waking up the electronic device. For example, before waking up the electronic device, the user A may input the audio information "how is the weather today" into the electronic device. The audio information "how is the weather today" outputted by the user may be collected. When collecting the audio information inputted into the electronic device by the user, the audio information may be collected through the microphone of the electronic device. In addition, when the audio information inputted into the electronic device by the user is collected before waking up the electronic device, a certain collection frequency may be configured. For example, the collection frequency may be configured to be once every 10 minutes.

The processor 603 may be configured to execute the application programs to perform a voiceprint recognition on the audio information.

Before the electronic device is woken up, more than one user may input audio information into the electronic device. For example, the user A may input the audio information such as "how is the weather today" and "how is the weather in Beijing". The user B may input the audio information such as "how do I get to Beijing" and "how far is Beijing". To improve the user experience, different wake words may be expanded for different users. After the audio information inputted into the electronic device by the user is collected before waking up the electronic device, the voiceprint recognition may be performed on the audio information. Through the voiceprint recognition, different users may be recognized from the audio information.

The processor 603 may also be configured to group the audio information based on the voiceprint recognition features and to group the audio information having a same voiceprint recognition feature into a same group.

Through the voiceprint recognition, the audio information having the same voiceprint recognition feature may be grouped or classified together. That is, the audio information of a same user may be grouped together. For example, the user A inputted audio information "how is the weather today" and "how is the weather in Beijing" may be grouped together into one group and the user B inputted audio information "how do I get to Beijing" and "how far is Beijing" may be grouped together into one group.

The memory 601 may be configured to store the audio information in groups.

Because the processing power of the electronic device before being woken up is low, the audio information inputted into the electronic device by the user collected before waking up the electronic device may be stored in groups.

The processor 603 may also be configured to generate the alternative wake words for each group of the audio information respectively based on the audio information stored in groups. The alternative wake words may facilitate the electronic device to switch from the sleep mode to the wake mode.

When the processing power of the electronic device is no longer low, that is, after the electronic device is woken up, the audio information stored in groups may be processed respectively to generate the wake words capable of switching the electronic device from the sleep mode to the wake mode. For example, "the weather today" may be the alternative wake words of the electronic device.

In some embodiments, when it is required to automatically expand the wake words of the electronic device, the audio information inputted into the electronic device by the user may be collected, and the voiceprint recognition may be performed on the audio information. Based on the voiceprint recognition features, the audio information may be grouped or classified. The audio information having the same voiceprint recognition feature may be grouped together. The audio information may be stored in groups. The wake words capable of switching the electronic device from the sleep mode to the wake mode may be generated for each group of the audio information. In the present disclosure, the wake words may be automatically expanded. Through the expanded wake words, the user may wake up the electronic device more rapidly, thereby improving the user experience.

The embodiments disclosed in the present disclosure may be described in a progressive manner. The description of each embodiment may focus on the differentiation as compared to other embodiments. Similarities between various embodiments may be referenced. For the device disclosed in the embodiments, because it corresponds to the method disclosed in the embodiments, the description of the device may be relatively simple, and may refer to the counterpart of the method.

Those skilled in the art may appreciate that the units and algorithm steps described in the specification of the present disclosure may be implemented in electronic hardware, computer software or a combination of both. To clearly illustrate the interchangeability of hardware and software, the structures and the steps of various embodiments have been described generally in terms of functions. Whether the functions are performed in hardware or software depends on the specific applications and design constraints of the technical solutions. Those skilled in the art may take different approaches to implement the described functions for different applications. However, such implementations should be construed as within the scope of the present disclosure.

It can be known from the description of the above embodiments that those skilled in the art can clearly understand that the present disclosure can be implemented in the software on the general-purpose hardware platform. Based on this understanding, the present disclosure may be embodied in the form of computer software product. The computer software product may be stored in a storage medium, such as ROM/RAM, magnetic disk, or optical disk, etc. The computer software product may include instructions for a computer equipment (e.g., a personal computer, a server, or a network equipment, etc.) to implement the methods of various embodiments of the present disclosure.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An information processing method, wherein the method is applied to an electronic device and comprises:
    collecting audio information received by the electronic device before waking up the electronic device;
    determining whether semantic information represented by the audio information satisfies a condition, wherein the condition facilitates the electronic device to switch from the sleep mode to the wake mode;
    in response to the semantic information represented by the audio information not satisfying the condition, storing the audio information; and
    after waking up the electronic device, generating, based on the stored audio information, alternative wake words to wake up the electronic device, wherein the wake words facilitate the electronic device to switch from a sleep mode to the wake mode, and generating the alternative wake words based on the stored audio information includes:

dividing the audio information into at least one unit of to-be-processed information;
calculating a similarity between each unit of the to-be-processed information and target wake words;
determining whether the similarity between the unit of the to-be-processed information and the target wake words is greater than a threshold; and
in response to determining the similarity between the unit of the to-be-processed information and the target wake words being greater than the threshold, determining the unit of the to-be-processed information as the alternative wake words.

2. The method according to claim 1, wherein, in response to determining that the similarity between the unit of the to-be-processed information and the target wake words is greater than the threshold, the method further includes:
determining whether a number of words of the unit of the to-be-processed information is within a number range; and
in response to determining that the number of words of the unit of the to-be-processed information is within the number range, determining the unit of the to-be-processed information as the alternative wake words.

3. The method according to claim 1, wherein:
collecting the audio information received by the electronic device by the user before waking up the electronic device further includes:
performing a voiceprint recognition on the audio information; and
based on voiceprint recognition features, grouping the audio information having a same voiceprint recognition feature into a same group; and
generating the alternative wake words based on the stored audio information includes:
generating the alternative wake words for each group of the audio information.

4. An electronic device, comprising:
a memory configured to store application programs and data generated by executing the application programs, and to store audio information;
an audio collector configured to collect the audio information received by an electronic device by a user before waking up the electronic device; and
a processor configured to:
determine whether semantic information represented by the audio information satisfies a condition, wherein the condition facilitates the electronic device to switch from the sleep mode to the wake mode;
in response to the semantic information represented by the audio information not satisfying the condition, store the audio information; and
after waking up the electronic device, generate, based on the stored audio information, alternative wake words to wake up the electronic device, wherein:
the wake words facilitate the electronic device to switch from a sleep mode to the wake mode; and
the processor is further configured to:
divide the audio information into at least one unit of to-be-processed information;
calculate a similarity between each unit of the to-be-processed information and target wake words;
determine whether the similarity between the unit of the to-be-processed information and the target wake words is greater than a threshold; and
in response to determining the similarity between the unit of the to-be-processed information and the target wake words being greater than the threshold, determine the unit of the to-be-processed information as the alternative wake words.

5. The device according to claim 4, wherein, after the audio collector collects the audio information received by the electronic device by the user before waking up the electronic device, the processor is configured to:
perform a voiceprint recognition on the audio information;
based on voiceprint recognition features, group the audio information having a same voiceprint recognition feature into a same group; and
generate the alternative wake words for each group of the audio information.

6. An information processing system, comprising:
a server including a memory configured to store application programs and data generated by executing the application programs, and to store audio information and a processor; and
an electronic device including an audio collector configured to collect the audio information received by an electronic device by a user before waking up the electronic device, wherein the server and the electronic device communication with each other, wherein:
the processor is configured to:
determine whether semantic information represented by the audio information satisfies a condition, wherein the condition facilitates the electronic device to switch from the sleep mode to the wake mode;
in response to the semantic information represented by the audio information not satisfying the condition, store the audio information; and
after waking up the electronic device, generate, based on the stored audio information, alternative wake words to wake up the electronic device, wherein:
the wake words facilitate the electronic device to switch from a sleep mode to the wake mode; and
the processor is further configured to:
divide the audio information into at least one unit of to-be-processed information;
calculate a similarity between each unit of the to-be-processed information and target wake words;
determine whether the similarity between the unit of the to-be-processed information and the target wake words is greater than a threshold; and
in response to determining the similarity between the unit of the to-be-processed information and the target wake words being greater than the threshold, determine the unit of the to-be-processed information as the alternative wake words.

7. The system according to claim 6, wherein after the audio collector collects the audio information received by the electronic device by the user before waking up the electronic device, the processor of the server is configured to:
perform a voiceprint recognition on the audio information;
based on voiceprint recognition features, group the audio information having a same voiceprint recognition feature into a same group; and
generate the alternative wake words for each group of the audio information.

* * * * *